United States Patent [19]
Willenbring

[11] 3,983,605
[45] Oct. 5, 1976

[54] CABLE TENSIONING AND COUPLING DEVICE

[76] Inventor: Joel Willenbring, 1617 Westcliff Drive, Suite 204, Newport Beach, Calif. 92660

[22] Filed: Oct. 29, 1975

[21] Appl. No.: 626,621

[52] U.S. Cl. .......................... 24/73 R; 24/263 LS; 114/39
[51] Int. Cl.² ..................... B63H 9/04; A44B 21/00
[58] Field of Search ......... 24/73 R, 263 LS, 263 PJ, 24/73 CE, 68 CT; 403/211; 114/90, 109, 39

[56] References Cited
UNITED STATES PATENTS

| | | | |
|---|---|---|---|
| 398,286 | 2/1889 | Speer | 24/68 CT |
| 554,834 | 2/1896 | Pickenpack | 114/109 |
| 2,926,403 | 3/1960 | Weissman | 24/3 R |
| 3,656,445 | 4/1972 | Padwick | 114/39 |

FOREIGN PATENTS OR APPLICATIONS

| | | | |
|---|---|---|---|
| 530,838 | 8/1954 | Belgium | 24/263 LS |
| 524,379 | 8/1930 | Germany | 24/263 LS |

Primary Examiner—Donald A. Griffin
Attorney, Agent, or Firm—Ben E. Lofstedt

[57] ABSTRACT

A device is disclosed herein for manually tensioning a cable having a cable end eyelet and for aligning and holding the eyelet fixed with respect to a chainplate joined to another cable, thereby freeing one hand to pass a locking pin or the like through the corresponding apertures in the chainplate and the eyelet to lock the eyelet with respect to the chainplate, including a crossmember with a pair of arms arranged in complementary, face-to-face fashion and projecting forwardly from the opposite ends of the crossmember and each having a pair of tines therein.

11 Claims, 5 Drawing Figures

U.S. Patent   Oct. 5, 1976   3,983,605
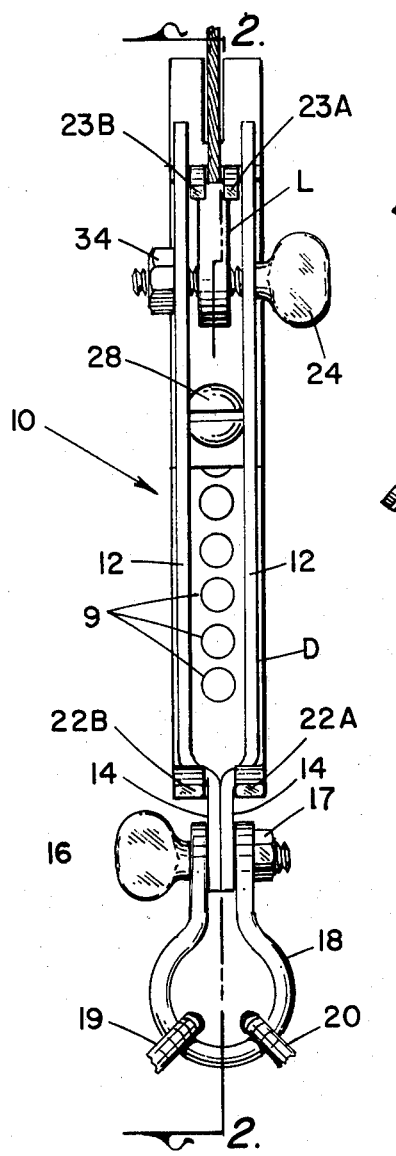
FIG.1
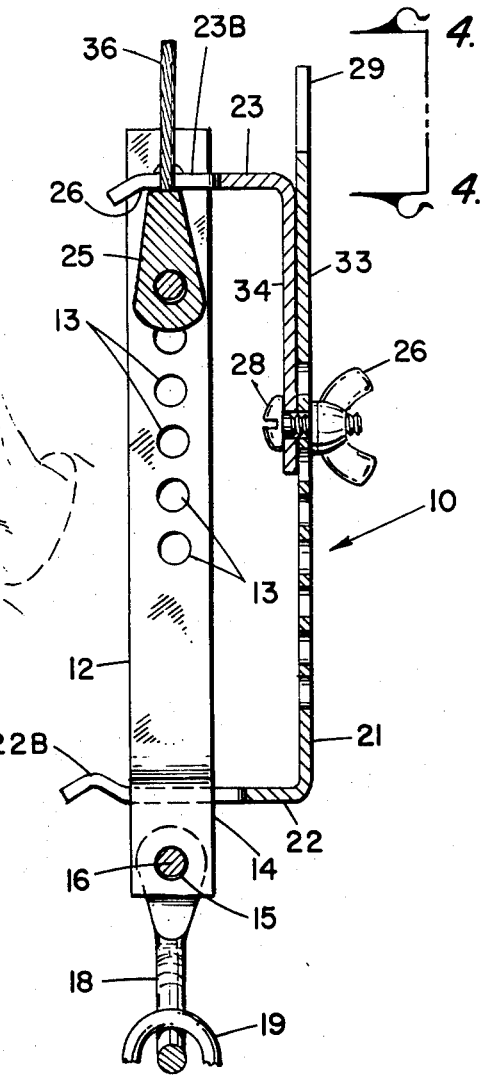
FIG.5
FIG.2
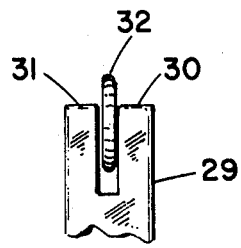
FIG.4
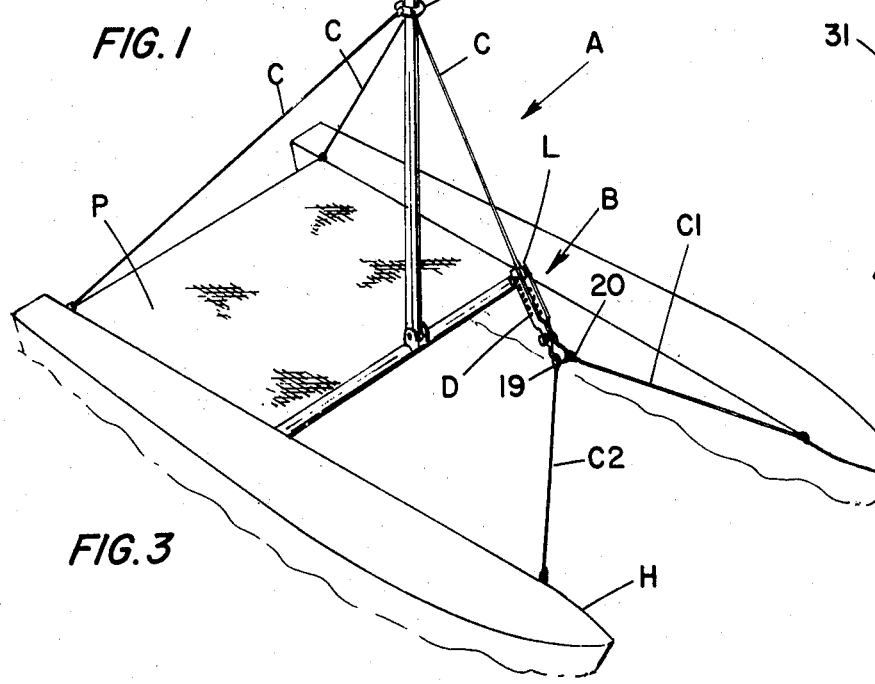
FIG.3

CABLE TENSIONING AND COUPLING DEVICE

BACKGROUND OF THE INVENTION

1. FIELD OF THE INVENTION

This invention relates to hand tools, and more particularly, to those hand tools which are useful in assisting in the manual process of linking cable end eyelets or shackles together with the cables under tension.

2. DESCRIPTION OF THE PRIOR ART

In recent years, small sailing craft such as the "HOBIE-CAT", a small catamaran, have become quite popular with water sailing enthusiasts. An example of such a sailboat is clearly depicted in FIG. NO. 3 of the Drawings herein.

Typically, this boat is from 12 to 20 feet or so in length, and is readily towable behind a motorized vehicle such as an automobile or motorhome on a trailer. The mast for the sail is quite long, being some 18 feet or more in length.

Consequently, in order to safely trailer this boat behind a vehicle without excessive overhang and vehicle length and to clear bridges and freeway overcrossings, the mast must be capable of being moved from its normal operating or vertical position to a horizontal position to enable it to be towed or trailered in the aforementioned fashion.

In the past, to safely raise and lower the mast, two persons were needed. The reasons for requiring the assistance of two persons will become more apparent as the mast rigging is described in detail and the process of raising and lowering the mast is further explained hereinafterwards.

The bottom of the mast on such a craft is pivotally secured to and rests of a crossmember bridging the two hulls of the catamaran. To support the mast in an upright fashion, three metal cables are secured to the mast intermediate the ends thereof and anchored to the hulls. Two of the cables are directly anchored to a different hull and are not adapted to be detached intermediate the ends thereof. When the mast is raised or lowered, these two cables are typically permitted to remain anchored in place and are neither detached nor adjusted during the process. The third, and remaining cable, is detachably secured at its other end to a pair of cable ends, the opposite ends of which are individually anchored to different hulls.

When the mast is raised to its upright position by hand, the third cable must be manually grasped near the extremity thereof in order to maintain the mast in its upright position and to bring the cable end, which is terminated in an eyelet-forming loop, into a near coupling position with another eyelet-forming loop at the end of another cable and/or cables securely anchored at the other end and/or ends thereof to the forward part of the hull or hulls. Of course, in order to do this, the other cable or cables must be manually grasped and held in near coupled position by the other hand.

The crux of the problem now clearly presents itself. Since both hands are now occupied in holding the ends of these cables to be coupled, a "third hand" is needed to pass a locking pin or nut-and-bolt combination or some such similar locking device through the eyelets or through the eyelet and chainplate combination to effect the desired cable coupling to support the mast in its erect position. Hence, two people are needed to erect the mast.

In addition, it should be quite obvious at this time that two people are also required to safely lower the mast to its horizontal trailering position as well as in errecting it.

SUMMARY OF THE INVENTION AND OBJECTS

A device is herein disclosed which is primarily useful in providing a means for assisting in the linking of cable end eyelets together, typically by way of an intermediate coupling device, such as a chainplate, thereby effectuating a coupling of the cables associated with the aforementioned eyelets.

Fundamentally, the present invention includes a crossmember which maybe adjustable in length, a pair of arms each having a base and a pair of tines secured to the base wherein the bases of each of the arms are secured to opposite ends of the crossmember and projecting forwardly in corresponding, complementary fashion therefrom, one of the pair of tines having a cradling means associated therewith forming a nesting place for the eyelet of the cable end and wherein the cable adjacent the eyelet is free to pass between the tines associated with the arm having the cradling means therein.

One important and primary object of the present invention is to provide a hand tool for temporarily maintaining the eyelet of a cable end in fixed relationship to the end of the other cable.

Another significant and important object of the present invention is to provide a hand tool for aligning a cable end eyelet with the corresponding apertures in a chainplate secured to another cable and thereafterwards holding the eyelet fixed with respect to the chainplate to free one hand for passing a locking pin or the like through the chainplate apertures and the eyelet to lock the eyelet to the chainplate.

Another important object of the present invention is to provide a device whereby one person is capable of erecting and securing a sailboat mast of the size and character as herein described without requiring the assistance of another person.

A still further and yet another primary and important object of the instant invention is to provide a hand tool for assisting in the pre-tensioning of at least one of the cables to be coupled prior to coupling with the other cable or cables.

A yet still further and important object of the present invention is to provide, in combination with the objects previously discussed and hereinafterwards further described, a hand tool for engaging the head of a thumb screw whereby the thumb screw may be turned more easily.

These and other objects and advantages of the invention will become more readily apparent from the following description of a preferred form thereof, and from the accompanying drawing illustrating that form in which:

BRIEF DESCRIPTION OF THE DRAWINGS

FIG. 1 is a front elevational view of the present invention shown engaged with a cable end eyelet and chainplate shackled to a pair of cable end eyelets and their corresponding cables.

FIG. 2 is a side elevational view taken along Plane 2 — 2 of FIG. 1.

FIG. 3 is an illustration of the mast rigging for a catamaran sailboat of the type and character as further described herein.

FIG. 4 is view of the thumb-screw wrench portion of the present invention taken along Plane 4 — 4 of FIG. 2.

FIG. 5 is a perspective view of the present invention illustrating the manual use thereof.

DESCRIPTION OF THE PREFERRED EMBODIMENT OF THE INVENTION

To more fully comprehend both the substance and nature of the invention herein disclosed, the problem sought to be solved by the use of the subject invention must first be clearly understood. In order to accomplish this task, it is necessary to descriptively detail the rigging of the typical sailboat for which the present invention was developed.

With reference now to FIG. NO. 3 of the Drawings, there is shown a small catamaran type water sailing craft of the "HOBIE-CAT" variety. Basically, a catamaran is generally shown at A, comprising a pair of laterally spaced apart hulls H, a platform P, and a mast M which rests on the platform P. The mast M is typically supported in its erect or upright operating position by means of at least three cables C. One end of each of the cables C are securely anchored to the mast M intermediate the ends of the mast M, at point M1. The other ends of two of the cables C are anchored by way of shackle-pin and/or chainplate combinations to separate hull portions disposed rearwardly of the mast M. The third cable C is arranged forwardly of the mast M and is detachably connectable to a pair of additional cables C1 and C2 via a chainplate-and-cable end eyelet-and-pin combination located generally at B. The opposite ends of cables C1 and C2 are anchored in suitable fashion as hereinbefore mentioned to separate hulls H.

Prior to raising the mast M from its horizontal trailering or towing position to its vertically erect position, the two rearwardly directed cables C are already adjusted and flexibly connected to the mast M at point M1. However, the third cable is detached at B from the two cables C1 and C2. After the mast M is raised to its fully erect position, the third cable C must be manually grasped near the extremity thereof to maintain the mast M in its upright position and to bring the cable end, which is terminated in an eyelet-forming loop L, into a near coupling position with the chainplate D. Obviously, to do this the chainplate D secured to the other cables C1 and C2 must be held in the other hand.

Now the crux of the problem clearly presents itself. Since both hands are now occupied in holding the cable eyelet L and chainplate D in a near coupled position, a "third hand" is needed to pass a locking pin or other similar locking device through the eyelet L and the chainplate D to effect the desired coupling therebetween. Consequently, in the past, two people were needed to erect and safely dismantle the mast M.

Having now presented and disclosed the full nature of the problem desired to be solved by the present invention, the instant invention may now by described and disclosed herein.

Referring now specifically to FIGS. NO. 1 and 2, the instant invention, a hand tool, is generally shown at 10, engaged with the chainplate D and the cable and eyelet L. As is clearly illustrated, the chainplate D consists primarily of two sheetmetal strips 12 having a plurality of holes 13 adjacently disposed along the length of the strips 12 forming the chainplate D. The strips 12 are dog-legged at corresponding ends 14 and joined together to form a U-shaped structure referred to herein as a chainplate D. A hole 15 through the joined-together ends 14 is used to secure the thumb screw 16 and nut 17 and its corresponding shackle 18 to the end 14 of the chainplate D. In turn, the shackle 18 is anchored to cable end eyelets 19 and 20 correspondingly terminating the cable ends of cables C2 and C1.

With particular emphasis now on FIG. NO. 2, the present invention, a hand tool 10, basically comprises a crossmember 21 and a pair of laterally-spaced arms 22, 23 projecting forwardly from the crossmember 21 in corresponding, complementary fashion. The forwardly disposed part of each of the arms 22, 23 are bifurcated, and include two, substantially parallel, laterally-separated tines 22A, 22B and 23A, 23B, respectively.

The crossmember 21 of the preferred embodiment includes a pair of L-shaped members, each having corresponding, upwardly projecting arms 33, 34 secured to the forwardly-projecting arms 22, 23 respectively. As clearly shown in FIGS. NO. 1 and 2, arm 33 has a plurality of transverse holes 9 adjacently disposed to one another along the length of the arm 33. Arm 34 has at least one hole which is transversely alignable with one of the holes 9 in arm 33. Once the holes are aligned, a bolt 28 may be passed therethrough and a wing nut 26 used to securely fasten arms 33 and 34 together.

Prior to actual use, the hand tool 10 is manually gripped as shown and illustrated in FIG. NO. 5.

The hand tool 10 is typically employed in the following manner. With the hand 10 manually gripped as shown in FIG. NO. 5, the tines 23A and 23B of the arm 23 are positioned above the the cable end eyelet 25 (which is the same eyelet identified as L in FIG. NO. 3) and urged thereinover and, at the same time, allowing the cable 36 to pass therebetween. The tines 23A and 23B are sufficiently spaced apart to permit the cable 36 to pass therebetween, but are not spaced apart so much as to allow the cable eyelet 25 to pass widthwise therebetween. Accordingly, when the hand tool 10 is manually urged downwardly, the tines 23A and 23B are forced into intimate engagement with the cable eyelet 25. By continuing to urge the hand tool 10 in a downwardly fashion the cable 36 will be drawn taunt and placed in tension.

The chainplate D and its associated cables C1 and C2 are held in the other hand of the person holding the hand tool 10 and drawn into near coupling disposition with respect to the hand tool 10, as clearly illustrated in FIG. NO. 2. When this is accomplished, the tines 22A and 22B of arm 22 are urged into engagement with the joined ends 14 of the chainplate D capturing the ends 14 therebetween. Once this is achieved, the hand holding the hand tool 10 may be released.

Since the cable 26 is under tension and the eyelet 25 is engaged with the tines 23A and 23B, the arm 23, and correspondingly so, the crossmember 21 and the arm 22, are also drawn upwardly in the direction of the applied tension force developed by the cable 36. As a result, the tines 22A and 22B of the arm 22 are directed into intimate abuttment with the underside portion of the U of the chainplate D.

At this time, one or both of the hands are free to grasp a thumb screw 24 and to pass the shank thereof through the prealigned holes 13 in the opposite strips 12 of the chainplate D and the eyelet 25, thereby locking the eyelet 25 to the chainplate D. Once the eyelet 25 is locked to the chainplate D, the hand tool 10 may be withdrawn therefrom in reverse fashion from that disclosed above.

To facilitate certain functions of the hand tool 10, the following items will now be noted and discussed.

In order to prevent the eyelet 25 from sliding away from the forwardmost end of the tines 23A and 23B prematurely resulting in disengagement therewith, cradling means 26 are provided wherein the eyelet 25 may be nested. Such cradling means 26 may consist of a cradle formed by bending the ends of the tines 23A and 23B towards the other pair of tines 22A and 22B. The purpose of such cradling means 26 for the eyelet 25 is to serve to prevent the eyelet 25 from slipping passed the forwardmost ends of the tines 23A and 23B resulting in disengagement therewith, in the absence of deliberate manually induced force directing the disengagement thereof.

In addition, the forwardmost ends of the tines 22A and 22B are curved first inwardly towards the arm 23 and then outwardly away from the arm 23 to form a curved ramp 35 to promote ease of engagement with the joined ends 14 of the chainplate D and thereafterwards to serve as a stop for preventing the tines 22A and 22B from slipping passed the joined ends 14 resulting in disengagement therewith in the absence of deliberate manually induced force directing disengagement therewith.

While I have shown and described a preferred embodiment in accordance with the present invention, it is understood that the same is not limited thereto but is susceptible of numerous changes and modifications within the spirit and scope thereof. For example, the hand tool 10 may be made more versatile by extending the end 29 of the arm 33 of the crossmember 21 and slotting the end 29 to thereby form a pair of tines 30, 31. In so doing, a thumb-screw wrench is formed. To use the wrench, the tines 30, 31 are slipped about the head 32 of a thumb-screw or wing nut, as the case may be, so that the head 32 is nested therebetween. Thereafterwards, the hand tool 10 is used to tighten or loosen the screw or wing nut in the conventional fashion using the extended body of the crossmember 21 as a handle to increase the leverage being applied to the head 32.

In accordance with the above, I, therefore, do not wish to be limited to the details shown and described herein but intend to cover all such changes and modifications as are encompassed by the scope of the appended claims.

I claim:

1. A hand tool for tensioning a cable with a cable end eyelet and for assisting in the manual process of coupling a cable end eyelet to a chainplate, wherein said chainplate is U-shaped and comprises a pair of laterally spaced, apertured members joined together at one end, comprising:
    a. a pair of arms arranged in spaced-apart relationship, said arms including a base and a pair of laterally separated tines having a space therebetween and projecting from said base, said space between one of said pair of tines being wider than said cable but smaller than said cable end eyelet and said space between said other tines being wider than the joined end of said chainplate but smaller than the remainder of said chainplate;
    b. a crossmember bridging said pair of arms and fixedly secured to said bases of said arms for maintaining said arms in fixed relationship to one another and forming a handle for said tool;
    c. adjustment means for varying the length of said crossmember; and
    d. lock means for lockably securing said crossmember in its newly adjusted position, wherein said adjustment means and said lock means include:
    said crossmember having first and second elements, said first element having at least one transverse aperture therein and said second element having a plurality of transverse apertures therein alignable with said aperture of said first element;
    fastening means adapted to be passed through said aperture in said first element and through one of said apertures in said second element thereby linking said first element with said second element; and
    means associated with said fastening means for urging said first element into intimate, abutting relationship with said second element.

2. The hand tool of claim 1 wherein said fastening means and said means associated with said fastening means for urging said first element into intimate, abutting relationship with said second element, respectively comprises:
    a. a thumb screw; and
    b. a wing nut threadably matable with said thumb screw.

3. The hand tool of claim 2 further comprising wrench means associated with said crossmember for engagement with the head of said thumb screw and wing nut.

4. A tool for manually tensioning a cable having a cable end eyelet and for aligning and holding the eyelet fixed with respect to a chainplate joined to another cable and having a pair of laterally spaced, apertured members joined at one end thereof, thereby freeing one hand to pass a locking pin or the like through the corresponding apertures in the chainplate and the eyelet to lock the eyelet with respect to the chainplate, comprising:
    a. a crossmember; and
    b. a pair of arms secured to opposite ends of said crossmember and disposed in substantially complementary, face-to-face fashion, each of said arms including a pair of laterally separated tines having a space therebetween, one of said pair of tines having a width smaller than said space between said chainplate members to enable said tines to fit therebetween and wherein the lateral separation between said tines is larger than the diameter of said cable but smaller than the thickness of said cable end eyelet so that when said cable is placed in said space between said tines and said tines are manually urged into intimate engagement with said eyelet, the application of additional manual force will cause said cable secured to said eyelet to be drawn taunt and therafterwards to be placed under tension and said other space between said other pair of tines having a width larger than the thickness of said joined together end of said chainplate so that said joined together chainplate end may fit easily therebetween, thereby holding said cable end secured to said eyelet fixed with respect to said chainplate and freeing one hand for passing a locking pin through the corresponding apertures in said chainplate and said eyelet and locking said eyelet to said chainplate.

5. The tool of claim 4, further including means for adjusting the length of said crossmember.

6. The tool of claim 4, further including means for locking said crossmember at a fixed length following adjustment of the length thereof.

7. The tool of claim 6, wherein said means for adjusting the length of said crossmember and means for locking said crossmember, comprise:
   a. a pair of L-shaped members each having an upwardly-projecting arm and a forwardly-projecting arm, one of said upwardly-projecting arms having a plurality of holes disposed adjacently to one another along the length thereof and the other of said upwardly-projecting arms having at least one hole therein and said other arms including said aforementioned tines; and
   b. locking means for removably securing said upwardly-projecting arms together via said holes therein whereby said L-shaped members are securely locked together in a C-shaped form, wherein the locked together pair of upwardly-projecting members form said crossmember and the length of said crossmember is adjusted by aligning different holes in said upwardly-projecting arms and thereafter employing said locking means to secure said arms together to fix said adjustment.

8. The tool of claim 4, further including a cradling means associated with one of said pair of tines wherein said eyelet portion adjacently disposed to said cable end may be nested following the engagement of said tines with said cable eyelet.

9. The tool of claim 8, wherein said cradling means comprises said one pair of said tines curved inwardly towards said other pair of tines to thereby form a nesting region for said eyelet to serve to prevent said eyelet from slipping passed the forwardmost ends of said tines resulting is disengagement therewith in the absence of deliberate manually induced force directing the disengagement thereof.

10. The tool of claim 9, wherein said other ends of said tines are curved first inwardly towards said pair of tines and then outwardly away from said pair of tines thereby forming a curved ramp to promote ease of engagement with said joined end of said chainplate and to thereafterwards serve as a stop for preventing said tines from slipping passed said joined ends of said chainplate causing disengagement therewith in the absence of deliberate manually induced force directing disengagement therewith.

11. The tool of claim 4, further comprising wrench means associated with said crossmember for engagement with the head of a thumb screw and wing nut.

* * * * *